(12) United States Patent
Banerjee et al.

(10) Patent No.: US 10,509,782 B2
(45) Date of Patent: Dec. 17, 2019

(54) MACHINE LEARNING BASED ENRICHMENT OF DATABASE OBJECTS

(71) Applicant: SAP SE, Walldorf (DE)

(72) Inventors: Debashis Banerjee, Bangalore (IN); Nithya Rajagopalan, Bangalore (IN)

(73) Assignee: SAP SE, Walldorf (DE)

(*) Notice: Subject to any disclaimer, the term of this patent is extended or adjusted under 35 U.S.C. 154(b) by 184 days.

(21) Appl. No.: 15/838,256

(22) Filed: Dec. 11, 2017

(65) Prior Publication Data

US 2019/0179937 A1 Jun. 13, 2019

(51) Int. Cl.
*G06F 17/30* (2006.01)
*G06N 99/00* (2019.01)
*G06F 16/24* (2019.01)
*G06N 20/00* (2019.01)

(52) U.S. Cl.
CPC ............. *G06F 16/24* (2019.01); *G06N 20/00* (2019.01)

(58) Field of Classification Search
CPC ................................. G06F 16/24; G06N 20/00
See application file for complete search history.

(56) References Cited

U.S. PATENT DOCUMENTS

| 6,233,575 | B1* | 5/2001 | Agrawal | G06F 16/355 |
| 2005/0261953 | A1* | 11/2005 | Malek | G06Q 30/02 |
| | | | | 705/7.32 |
| 2013/0124298 | A1* | 5/2013 | Li | G06Q 30/0241 |
| | | | | 705/14.42 |
| 2013/0151443 | A1* | 6/2013 | Kyaw | G06F 17/27 |
| | | | | 706/12 |
| 2013/0211880 | A1* | 8/2013 | Kannan | G06Q 10/06398 |
| | | | | 705/7.32 |
| 2015/0096023 | A1* | 4/2015 | Mesdaq | H04L 63/145 |
| | | | | 726/23 |
| 2016/0267396 | A1* | 9/2016 | Gray | G06N 20/00 |
| 2017/0330106 | A1* | 11/2017 | Lindsley | G06N 5/02 |
| 2018/0173755 | A1* | 6/2018 | Xia | G06F 16/24537 |
| 2018/0210824 | A1* | 7/2018 | Kochura | G06F 11/3696 |

* cited by examiner

*Primary Examiner* — Giovanna B Colan
(74) *Attorney, Agent, or Firm* — Mintz Levin Cohn Ferris Glovsky and Popeo, P.C.

(57) ABSTRACT

A method for enriching an object in a database may include determining, by a trained machine learning model, that a first object at the database is same and/or similar to a second object at the database. The first object and the second object may be part of a schema of the database. The second object may be subordinate to the first object. In response to the determination that the first object is same and/or similar to the second object, one or more attributes associated with the second object may be added to the first object. Related systems and articles of manufacture including computer program products are also provided.

20 Claims, 5 Drawing Sheets

MACHINE LEARNING BASED ENRICHMENT OF DATABASE OBJECTS

TECHNICAL FIELD

The subject matter described herein relates generally to database processing and more specifically to a machine learning based technique for enriching database objects.

BACKGROUND

Data stored in a database may be organized in accordance with a schema. For example, the schema of a database may define the structure of the database including, for example, tables, relationships, views, indices, and/or the like. The schema may include objects that represent different data elements. For instance, in a retailer's inventory management system, each object may correspond to a different product and may include one or more attributes associated with the product. Meanwhile, the relationships between two or more objects may reflect the relationships between the corresponding products.

SUMMARY

Systems, methods, and articles of manufacture, including computer program products, are provided for enriching objects in a database. In one aspect, there is provided a system. The system may include at least one data processor and at least one memory. The at least one memory may store instructions that result in operations when executed by the at least one data processor. The operations may include: determining, by a trained machine learning model, that a first object at a database is same and/or similar to a second object at the database, the first object and the second object comprising a schema of the database, and the second object being subordinate to the first object; and in response to the determination that the first object is same and/or similar to the second object, adding, to the first object, one or more attributes associated with the second object.

In some variations, one or more features disclosed herein including the following features can optionally be included in any feasible combination. The trained machine learning model may be configured to generate at least one cluster of objects comprising a grouping of same and/or similar objects at the database. The first object may be determined to be same and/or similar to the second object based at least on the first object and the second object both being in a same cluster of objects. The trained machine learning model may be configured to generate a first cluster of objects comprising a grouping of same and/or similar objects at the database. The first cluster of objects may include the second object. The first object may be determined to be same and/or similar to the second object based at least on a distance between the first object and the first cluster of objects. The trained machine learning model may further generate a second cluster of objects comprising another grouping of same and/or similar objects at the database. The first object may be determined to be same and/or similar to the second object based at least on the distance between the first object and the first cluster of objects being less than a distance between the first object and the second cluster of objects.

In some variations, the second object may descend directly and/or indirectly from the first object such that the second object inherits at least one attribute associated with the first object. The one or more attributes may be added to the first object by at least adding, to a database table corresponding to the first object, at least one column for the one or more attributes. The one or more attributes may be added to the first object by at least adding, to a structured data representation of the first object, at least one key-value corresponding to the one or more attributes.

In some variations, a machine learning model may be trained, based at least on training data, to identify same and/or similar objects in the training data. The training data may include one or more existing objects and/or existing schemas that include objects known to be same, similar, and/or different. The trained machine learning model may include a cluster analyzer, a neural network, a support vector machine, a scorecard, logistic regression model, a Bayesian model, and/or a decision tree.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The relationship between different objects in a database may be hierarchical. For instance, the objects may form a tree structure in which one or more subordinate objects (e.g., children objects) descend from a superior object (e.g., a parent object and/or an ancestor object). In a conventional database, each object may be associated with a predetermined set of attributes. Moreover, while a subordinate object may inherit attributes from one or more superior objects, a superior object may be unable inherit any attributes from subordinate objects even when those attributes are relevant to the superior object. As such, objects in a conventional database may not provide an adequate representation of the underlying data.

In some example embodiments, a machine learning model may be trained to enrich an object in a database by at least identifying one or more attributes that should be added to the object. For example, the machine learning model may be trained based on training data that includes one or more existing objects and/or existing schemas. The trained machine learning model may identify at least a first object in the database that is same and/or similar to a second object in the database. Based on the first object being same and/or similar to a second object, the trained machine learning model may determine that at least some of the attributes associated with the first object should be added to the second object.

In some example embodiments, a database may be configured to support reverse inheritance, which enables a superior object to be enriched by inheriting attributes from one or more subordinate objects that descend from the superior object. For example, the trained machine learning model may determine to enrich the second object by at least adding, to the second object, at least some of the attributes associated with the first object. Reverse inheritance may be required when the second object is a superior object (e.g., a parent object and/or an ancestor object) and the first object is a subordinate object (e.g., a child object) that descends from the second object. With reverse inheritance, the second object may be enriched by inheriting at least some of the attributes associated with the first object.

Figure 1:
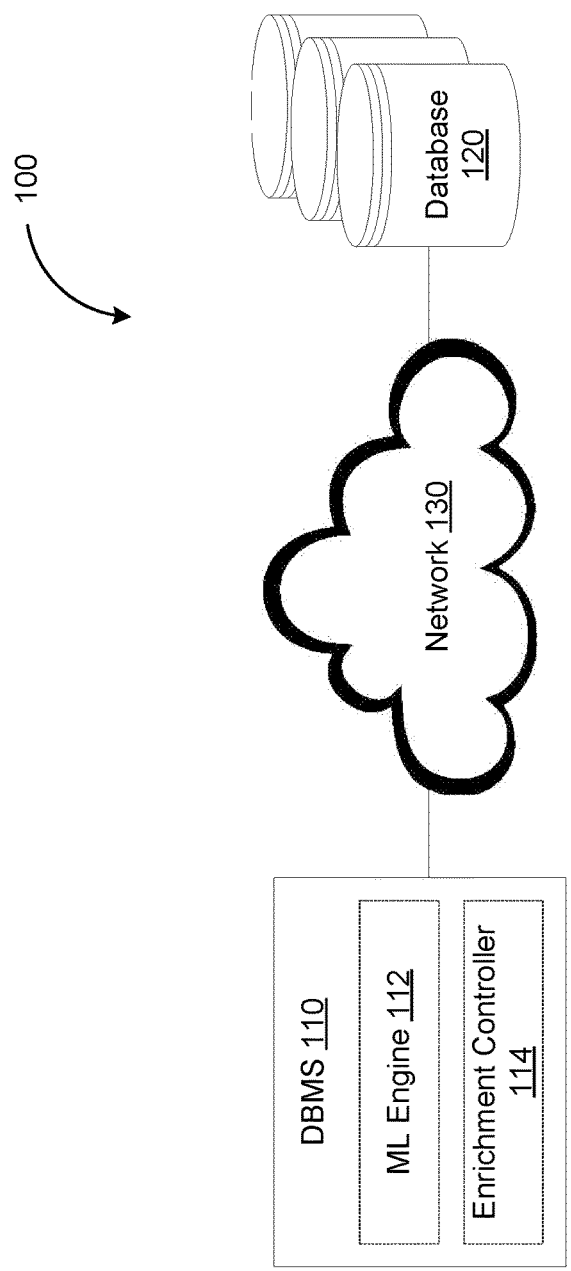
FIG. 1 depicts a system diagram illustrating a database system, in accordance with some example embodiments.

FIG. 1 depicts a system diagram illustrating a database system 100, in accordance with some example embodiments. Referring to FIG. 1, the database system 100 may include a database management system 110 and a database 120. The database 120 may be any type of database including, for example, an in-memory database, a relational database, a non-SQL (NoSQL) database, and/or the like. Meanwhile, the database management system 110 may support a variety of operations (e.g., structured query language (SQL) queries) for accessing the data stored in the database 120.

As shown in FIG. 1, the database management system 110 may be communicatively coupled with the database 120 via a network 130. It should be appreciated that the network 130 may be any wired and/or wireless network including, for example, a local area network (LAN), a wide area network (WAN), a public land mobile network (PLMN), the Internet, and/or the like.

The database 120 may store data in accordance with a schema, which may define the structure of the database 120 including, for example, tables, relationships, views, indices, and/or the like. As noted, the schema of the database 120 may include one or more objects. For instance, the database 120 may implement an inventory management system. Accordingly, the objects in the database 120 may correspond to different products such as, for example, different types of grocery items such as baked goods, produce, dairy, and/or the like. However, it should be appreciated that the database 120 may also be schema-less and may store data in the form of one or more key-value pairs.

In some example embodiments, the database management system 110 may be configured to enrich a first object stored in the database 120 by at least identifying attributes that should be added to the first object. For instance, as shown in FIG. 1, the database management system 110 may include a machine learning engine 112 and an enrichment controller 114. The machine learning engine 112 may include one or more machine learning models that have been trained to identify attributes that should be added to the first object. For example, the trained machine learning models may identify a second object in the database 120 that is same and/or similar to the first object. The second object may be identified as same and/or similar to the first object if the first object and the second object share at least some common attributes.

In response to determining that the first object is same and/or similar to the second object, the enrichment controller 114 may enrich the first object by adding, to the first object, at least some of the attributes associated with the second object. It should be appreciated that the trained machine learning models may be any type of machine learning model including, for example, neural networks, support vector machines, scorecards, logistic regression models, Bayesian models, decision trees, and/or the like. Adding an attribute to the first object may include adding a column to a database table corresponding to the first object and/or adding a key-value pair to a structured data representation (e.g., Hypertext Markup Language (HTML), JavaScript Object Notation (JSON), and/or the like) of the first object.

In some example embodiments, the trained machine learning model may be configured to identify same and/or similar objects by at least generating one or more clusters of objects. For instance, two or more objects may be grouped into the same cluster based on attributes associated with the objects. Meanwhile, the machine learning engine 112 may determine that the first object is same and/or similar to the second object when the first object and the second object are both grouped into the same cluster. Alternatively and/or additionally, the machine learning engine 112 may determine that the first object is the same and/or similar to the second object when a distance between the first object and the cluster including the second object does not exceed a threshold value. The machine learning engine 112 may also determine that the first object is same and/or similar to the second object when the distance between the first object and a first cluster that includes the second object is less than the distance between the first object and other clusters of objects such as, for example, a second cluster that includes a third object.

In some example embodiments, the distance between an object and a cluster of objects may be expressed as a Mahalanobis distance corresponding to a deviation between the attributes of the object and the expected attributes of the cluster of objects as a whole. To further illustrate, the object may be represented by a k number of attribute and may thus be denoted as $\vec{x}=(x_1, x_2, x_3, \ldots, x_k)^T$. Meanwhile, the expected features of the cluster of objects as a whole may be denoted as $\vec{\mu}=(\mu_1, \mu_2, \mu_3, \ldots, \mu_k)$. The Mahalanobis distance $D_M$ between the unclassified file $\vec{x}$ and the expected features $\vec{\mu}$ of the file set as a whole may be expressed by the following Equation (1):

$$D_M(\vec{x}) = \sqrt{(\vec{x}-\vec{\mu})^T S^{-1} (\vec{x}-\vec{\mu})}$$

wherein S may denote a covariance matrix describing the expected covariation between the attributes of the objects in the cluster of objects. The covariance between two attributes may correspond to a measure of how the two attributes may change together. Thus, the covariance matrix describes how a set of attributes are expected to change in tandem. For instance, two attributes may have a positive covariance when both attributes increase or decrease in tandem. By contrast, two attributes may have a negative covariance when one attributes is increasing while the other is decreasing. The covariance matrix may range from a highly structured matrix (e.g., an identity matrix or another type of diagonal matrix) to completely unstructured matrix where the elements of the matrix do not adhere to a discernable pattern.

In some example embodiments, the database management system 110 may be configured to support reverse inheritance. With reverse inheritance, a superior object may inherit attributes from one or more subordinate objects that descend from the superior object. For example, the database management system 110 may support reverse inheritance by at least adding, to a parent object, attributes associated with a child object that descends from the parent object. The attributes associated with the child object may be added to the parent object based at least on a determination for example, by the machine learning engine 112, that the parent object is same and/or similar to the child object and that at least some of the attributes associated with the child object should be added to the parent object.

Figure 2:
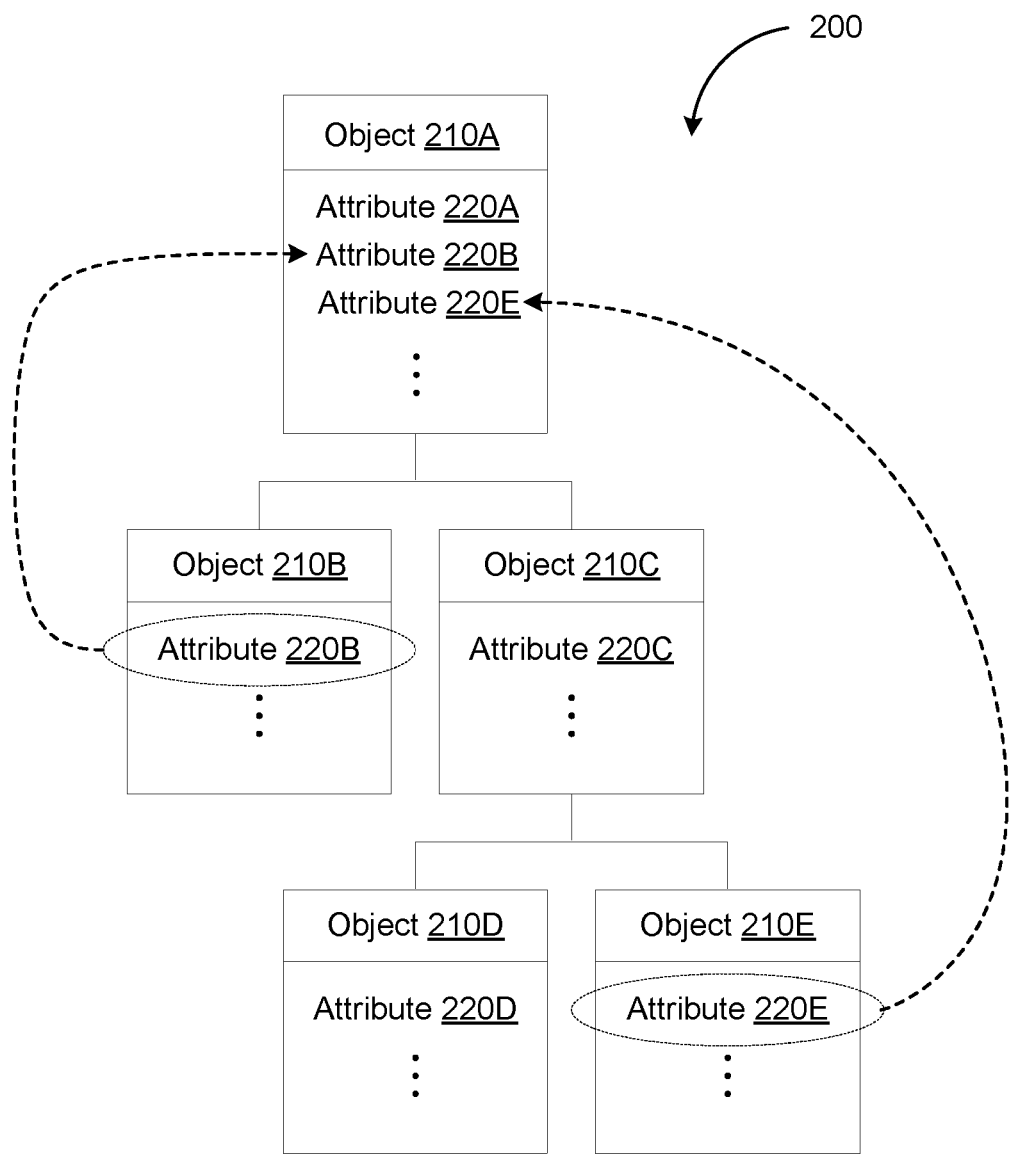
FIG. 2 depicts a database schema, in accordance with some example embodiments.

To further illustrate, FIG. 2 depicts a schema 200, in accordance with some example embodiments. Referring to FIGS. 1-2, data in the database 120 may be stored in accordance with the schema 200. As shown in FIG. 2, the schema 200 may include a plurality of objects including, for example, a first object 210A, a second object 210B, a third object 210C, a fourth object 210D, and/or a fifth object 210E. In some example embodiments, each of the first object 210A, the second object 210B, the third object 210C, the fourth object 210D, and/or the fifth object 210E may correspond to a product in an inventory management system implemented by the database 120.

As shown in FIG. 2, each of the first object 210A, the second object 210B, the third object 210C, the fourth object 210D, and/or the fifth object 210E may be associated with one or more attributes. For instance, the first object 210A may be associated with a first attribute 220A, the second object 210B may be associated with a second attribute 220B, the third object 210C may be associated with a third attribute 220C, the fourth object may be associated with a fourth attribute 220D, and/or the fifth object may be associated with a fifth attribute 220E. In some example embodiments, each of the first object 210A, the second object 210B, the third object 210C, the fourth object 210D, and/or the fifth object 210E may correspond to a product in an inventory management system implemented by the database 120, each of the first attribute 220A, the second attribute 220B, the third attribute 220C, the fourth attribute 220D, and/or the fifth attribute 220E may be a characteristic of the corresponding product such as, for example, price, ingredients, weight, dimensions, and/or the like.

Referring again to FIG. 2, the relationship between the first object 210A, the second object 210B, the third object 210C, the fourth object 210D, and/or the fifth object 210E may be hierarchical. For instance, as shown in FIG. 2, the first object 210A, the second object 210B, the third object 210C, the fourth object 210D, and/or the fifth object 210E may form a tree structure. The first object 210A may be a superior object residing at the root of the tree structure. As such, the second object 210B, the third object 210C, the fourth object 210D, and/or the fifth object 210E may be subordinate objects that descend directly and/or indirectly from the first object 210A. Meanwhile, the third object 210C, which may descend from the first object 210A, may be a parent object with the fourth object 210D and the fifth object 210E as its children objects. Although not shown, it should be appreciated that the first object 210A, the second object 210B, the third object 210C, the fourth object 210D, and/or the fifth object 210E may form a different hierarchical structure including, for example, a network structure and/or the like.

As noted, a subordinate object may inherit at least some of the attributes associated with the superior objects from which the subordinate object descends. For example, the second object 210B may inherit the first attribute 220A from the first object 210A. Alternatively and/or additionally, the fourth object 210D may inherit the third attribute 220C from the third object 210C and/or the first attribute 220A from the first object 210A.

In some example embodiments, a superior object may also inherit at least some of the attributes associated with a subordinate object that descends directly and/or indirectly from the superior object. Adding attributes from the subordinate object to the superior object may enrich the superior object such that the superior object includes additional attributes relevant to the superior object. For example, the machine learning engine 112 may include one or more machine learning models that are trained to determine that the first object 210A is same and/or similar to the second object 210B such that the first object 210A should inherit at least the second attribute 220B from the second object 210B. Accordingly, the enrichment controller 114 may add, to the first object 210A, at least the second attribute 220B from the second object 210B. Alternatively and/or additionally, the machine learning engine 112 may determine that the first object 210A is same and/or similar to the fifth object 210E such that the first object 210A should inherit the fifth attribute 220E from the fifth object 210E. In response to the determination by the machine learning engine 112 that the first object 210A should inherit the fifth attribute 220E from the fifth object 210E, the enrichment controller 114 may add the fifth attribute 220E to the first object 210A.

Figure 3:
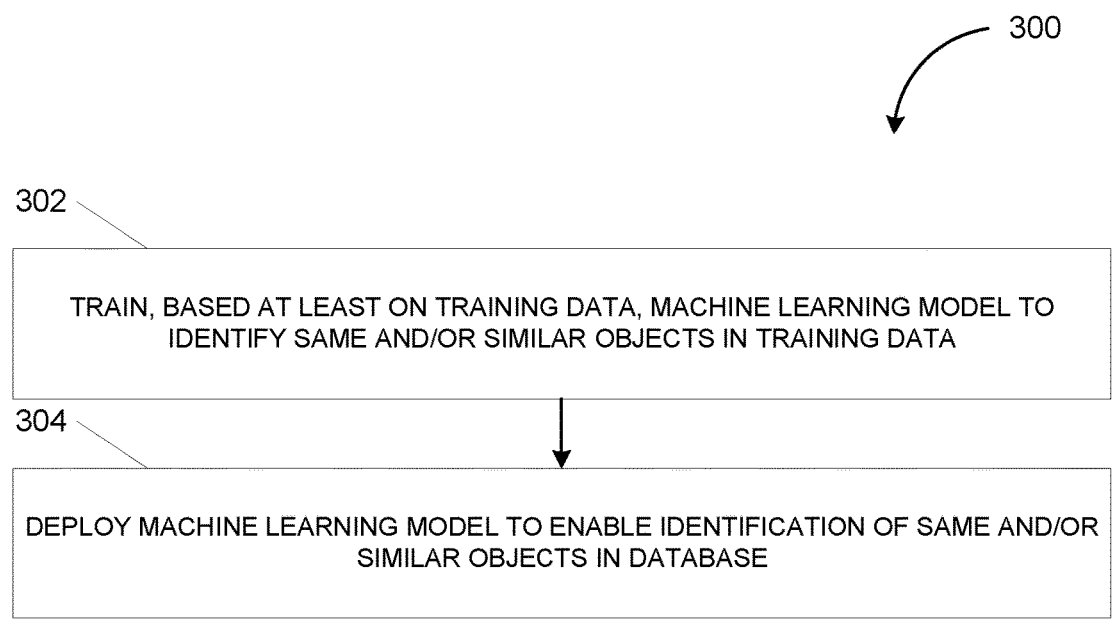
FIG. 3 depicts a flowchart illustrating a process for training a machine learning model for identifying same and/or similar objects in a database, in accordance with some example embodiments.

FIG. 3 depicts a flowchart illustrating a process 300 for training a machine learning model for identifying same and/or similar objects in a database, in accordance with some example embodiments. Referring to FIGS. 1-3, the process 300 may be performed by the database management system 110, for example, by the machine learning engine 112. In some example embodiments, the database management system 110 may perform the process 300 in order to generate a machine learning model that is trained to identify same and/or similar objects in the database 120. The database management system 110 may perform the process 300 to train any machine learning model including, for example, a cluster analyzer, a neural network, a support vector machine, a scorecard, logistic regression model, a Bayesian model, a decision tree, and/or the like.

At 302, the database management system 110 may train, based at least on training data, a machine learning model to identify same and/or similar objects in the training data. For example, in some example embodiments, the machine learning model may be trained to identify same and/or similar objects in the training data by at least generating one or more clusters of objects. As noted, two or more objects may be grouped into the same cluster based on attributes associated with the objects. Meanwhile, the training data may include existing objects and/or existing schemas that include objects known to be same, similar, and/or different. The trained machine learning model may be able to differentiate between same and/or similar objects that belong in the same cluster and different objects that belong in different clusters.

At 304, the database management system 110 may deploy the trained machine learning model to enable the identification of same and/or similar objects in the database 120. In some example embodiments, the trained machine learning model may be deployed remotely, for example, as a cloud service and/or a web application. For instance, as shown in FIG. 1, one or more functionalities of the trained machine learning models may be available at the database management system 110 via the network 130. Alternatively and/or additionally, the trained machine learning model may be deployed as computer software and/or dedicated circuitry (e.g., application specific integrated circuits (ASICs)).

For example, the database 120 may implement an inventory management system such that each object in the database 120 may correspond to a different product including, for example, baked goods, dairy, produce, and/or the like. As such, in some example embodiments, the trained machine learning model may be deployed at the database 120 in order to identify same and/or similar objects within the inventory management system based on the objects being associated with the same category and/or the objects being variations of the same item. For instance, the trained machine learning model may identify objects corresponding to baked goods including, for example, cakes, cookies, and breads, as being same and/or similar objects. Alternatively and/or additionally, the trained machine learning model may also identify objects corresponding to dairy including, for example, eggs, milk, and yogurt, as being same and/or similar objects. The trained machine learning model may also identify objects corresponding to different types of pizzas (e.g., vegetarian, pepperoni, cheese, and/or the like) as being same and/or similar objects.

Figure 4:
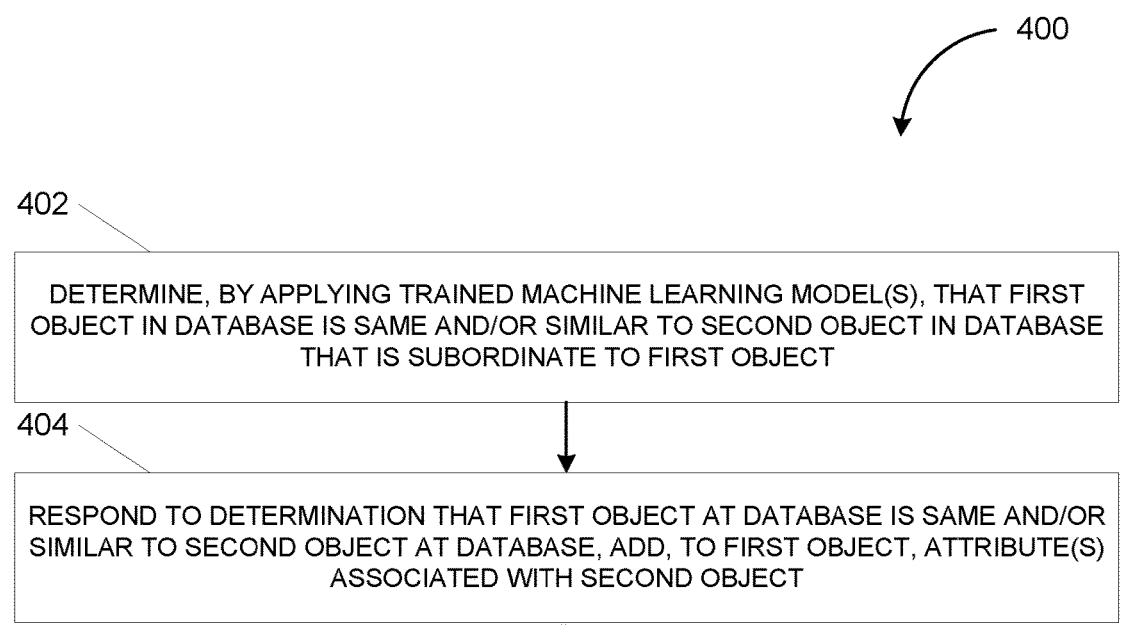
FIG. 4 depicts a flowchart illustrating a process for enriching an object in a database, in accordance with some example embodiments.

FIG. 4 depicts a flowchart illustrating a process 400 for enriching an object in a database, in accordance with some example embodiments. Referring to FIGS. 1-4, the process 400 may be performed by the database management system 110, for example, by the enrichment controller 114. In some example embodiments, the database management system 110 may perform the process 400 in order to enrich a first object by at least adding, to the first object, one or more attributes from at least a second object that is subordinate to the first object.

At 402, the database management system 110 may determine, by applying one or more trained machine learning models, that a first object at the database 120 is same and/or similar to a second object at the database 120 that is subordinate to the first object. For instance, the trained machine learning model may determine that the first object 210A is same and/or similar to the second object 210B and/or the fifth object 210E.

As noted, the database 120 may implement an inventory management system such that each object in the database 120 may correspond to a different product including, for example, baked goods, dairy, produce, and/or the like. Thus, the trained machine learning model may determine that the first object 210A is same and/or similar to the second object 210B and/or the fifth object 210E if the first object 210A, the second object 210B, and/or the fifth objet 210E are all some type of a baked good, produce, dairy, and/or the like. For example, the first object 210A may corresponding to baked goods while the second object 210B may correspond to cookies and the fifth object 210E may correspond to breads. Alternatively and/or additionally, the first object 210A may correspond to pizzas while the second object 210B may correspond to pepperoni pizzas and the fifth objet 210E may correspond to cheese pizzas.

At 404, the database management system 110 may respond to the determination that the first object at the database 120 is same and/or similar to the second object at the database by at least adding, to the first object, one or more attributes associated with the second object. As noted, the database management system 110 may support reverse inheritance such that a superior object may inherit attributes from one or more subordinate objects that descend directly and/or indirectly from the superior object. Referring again to FIG. 2, upon determining that the first object 210A is same and/or similar to the second object 210B and/or the fifth object 210E, the database management system 110 may add, to the first object 210A, the second attribute 220B from the second object 210B and/or the fifth attribute 220E from the fifth object 210E. It should be appreciated that the addition of the second attribute 220B and/or the fifth attribute 220E may enrich the first object 210A such that the first object 210A may be associated with additional attributes that may be relevant to the first object. Moreover, the database management system 110 may add the second attribute 220B and/or the fifth attribute 220E to the first object 210A by adding, to a database table corresponding to the first object 210A, a column for the second attribute 220B and/or a column for the fifth attribute 220E. Alternatively and/or additionally, the database management system 110 may add the second attribute 220B and/or the fifth attribute 220E to the first object 210A by adding, to a structured data representation of the first object 210A, one or more key-value pairs for the second attribute 220B and/or one or more key-value pairs for the fifth attribute 220E.

For instance, to further illustrate, where the first object 210A corresponds to baked goods, the second object 210B corresponds to cookies, and the fifth object 210E corresponds to breads, the first object 210A may inherit, from the second object 210B and/or the fifth object 210E, attributes corresponding to gluten free certification. Alternatively and/or additionally, where the first object 210A correspond to pizzas, the second object 210B corresponds to pepperoni pizzas, and the fifth objet 210E corresponds to cheese pizzas, the first object 210A may inherit, from the second object 210B and/or the fifth object 210E, attributes indicating whether the pizza is frozen.

Figure 5:
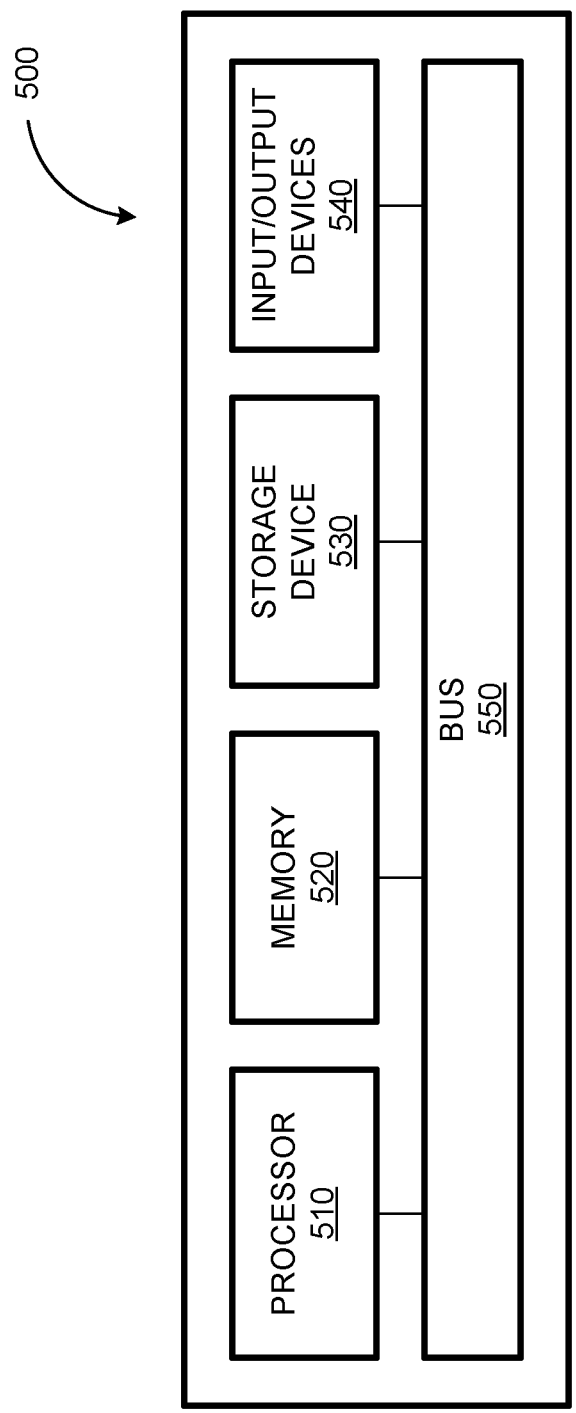
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, cause operations comprising:
        determining, by a trained machine learning model, that a first object at a database is same and/or similar to a second object at the database, the first object and the second object comprising a schema of the database, and the second object being subordinate to the first object; and
        in response to the determination that the first object is same and/or similar to the second object, adding, to the first object, one or more attributes associated with the second object.

2. The system of claim 1, wherein the trained machine learning model is configured to generate at least one cluster of objects comprising a grouping of same and/or similar objects at the database, and wherein the first object is determined to be same and/or similar to the second object based at least on the first object and the second object both being in a same cluster of objects.

3. The system of claim 1, wherein the trained machine learning model is configured to generate a first cluster of objects comprising a grouping of same and/or similar objects at the database, wherein the first cluster of objects includes the second object, and wherein the first object is determined to be same and/or similar to the second object based at least on a distance between the first object and the first cluster of objects.

4. The system of claim 3, wherein the trained machine learning model further generates a second cluster of objects comprising another grouping of same and/or similar objects at the database, and wherein the first object is determined to be same and/or similar to the second object based at least on the distance between the first object and the first cluster of objects being less than a distance between the first object and the second cluster of objects.

5. The system of claim 1, wherein the second object descends directly and/or indirectly from the first object such that the second object inherits at least one attribute associated with the first object.

6. The system of claim 1, wherein the one or more attributes are added to the first object by at least adding, to a database table corresponding to the first object, at least one column for the one or more attributes.

7. The system of claim 1, wherein the one or more attributes are added to the first object by at least adding, to a structured data representation of the first object, at least one key-value corresponding to the one or more attributes.

8. The system of claim 1, further comprising:
    training, based at least on training data, a machine learning model to identify same and/or similar objects in the training data.

9. The system of claim 8, wherein the training data comprises one or more existing objects and/or existing schemas that include objects known to be same, similar, and/or different.

10. The system of claim 1, wherein the trained machine learning model comprises a cluster analyzer, a neural network, a support vector machine, a scorecard, logistic regression model, a Bayesian model, and/or a decision tree.

11. A computer-implemented method, comprising:
    determining, by a trained machine learning model, that a first object at a database is same and/or similar to a second object at the database, the first object and the second object comprising a schema of the database, and the second object being subordinate to the first object; and
    in response to the determination that the first object is same and/or similar to the second object, adding, to the first object, one or more attributes associated with the second object.

12. The method of claim 11, wherein the trained machine learning model is configured to generate at least one cluster of objects comprising a grouping of same and/or similar objects at the database, and wherein the first object is determined to be same and/or similar to the second object based at least on the first object and the second object both being in a same cluster of objects.

13. The method of claim 11, wherein the trained machine learning model is configured to generate a first cluster of objects comprising a grouping of same and/or similar objects at the database, wherein the first cluster of objects includes the second object, and wherein the first object is determined to be same and/or similar to the second object based at least on a distance between the first object and the first cluster of objects.

14. The method of claim 13, wherein the trained machine learning model further generates a second cluster of objects comprising another grouping of same and/or similar objects at the database, and wherein the first object is determined to be same and/or similar to the second object based at least on the distance between the first object and the first cluster of objects being less than a distance between the first object and the second cluster of objects.

15. The method of claim 11, wherein the second object descends directly and/or indirectly from the first object such that the second object inherits at least one attribute associated with the first object.

16. The method of claim 11, wherein the one or more attributes are added to the first object by at least adding, to a database table corresponding to the first object, at least one column for the one or more attributes.

17. The method of claim 11, wherein the one or more attributes are added to the first object by at least adding, to a structured data representation of the first object, at least one key-value corresponding to the one or more attributes.

18. The method of claim 11, further comprising:
    training, based at least on training data, a machine learning model to identify same and/or similar objects in the training data.

19. The method of claim 18, wherein the training data comprises one or more existing objects and/or existing schemas that include objects known to be same, similar, and/or different.

20. A non-transitory computer-readable medium including instructions, which when executed by at least one data processor, cause operations comprising:

determining, by a trained machine learning model, that a first object at a database is same and/or similar to a second object at the database, the first object and the second object comprising a schema of the database, and the second object being subordinate to the first object; and in response to the determination that the first object is same and/or similar to the second object, adding, to the first object, one or more attributes associated with the second object.

* * * * *